Sept. 27, 1927.
J. W. MADDOX
1,643,625
AGRICULTURAL MACHINE
Filed Aug. 11, 1926
2 Sheets-Sheet 1
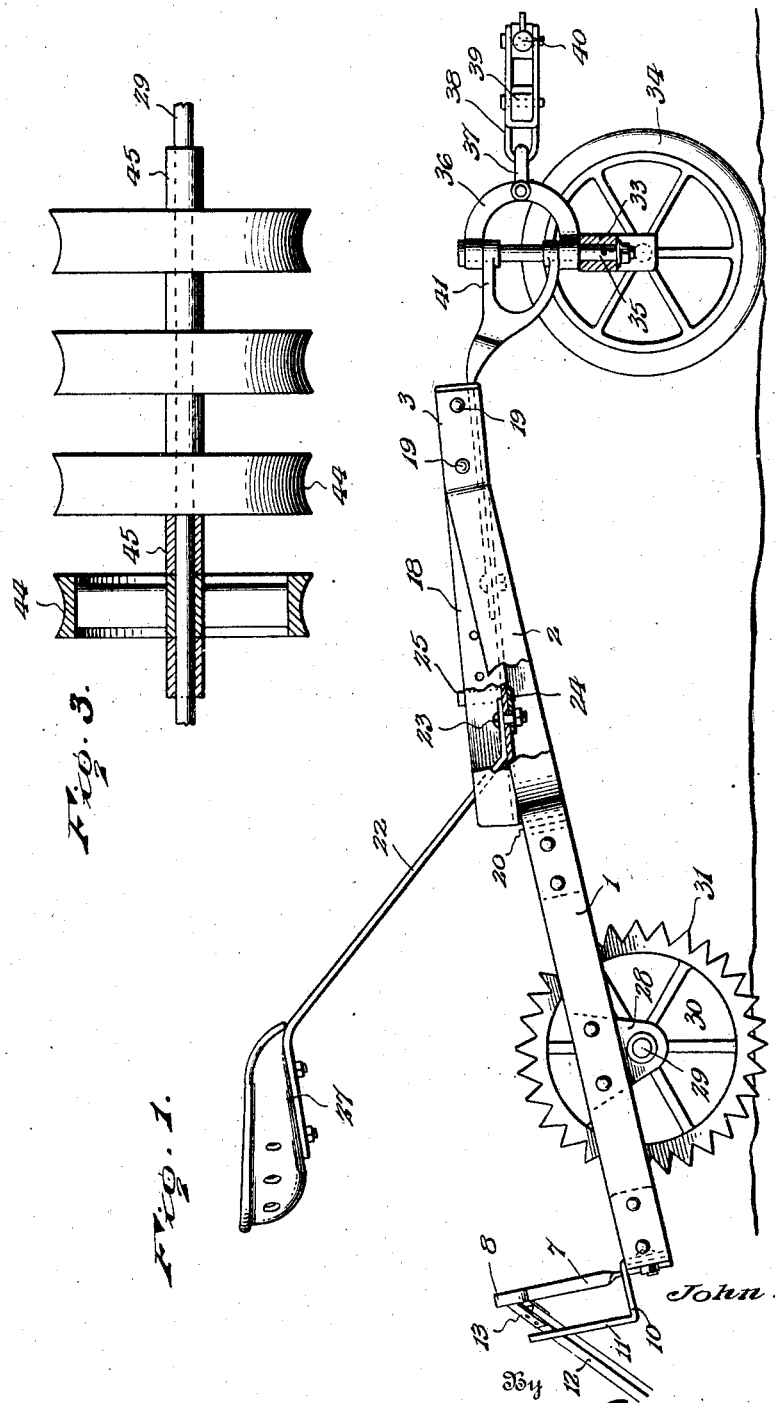
Inventor
John W. Maddox
By Lacey & Lacey, Attorneys

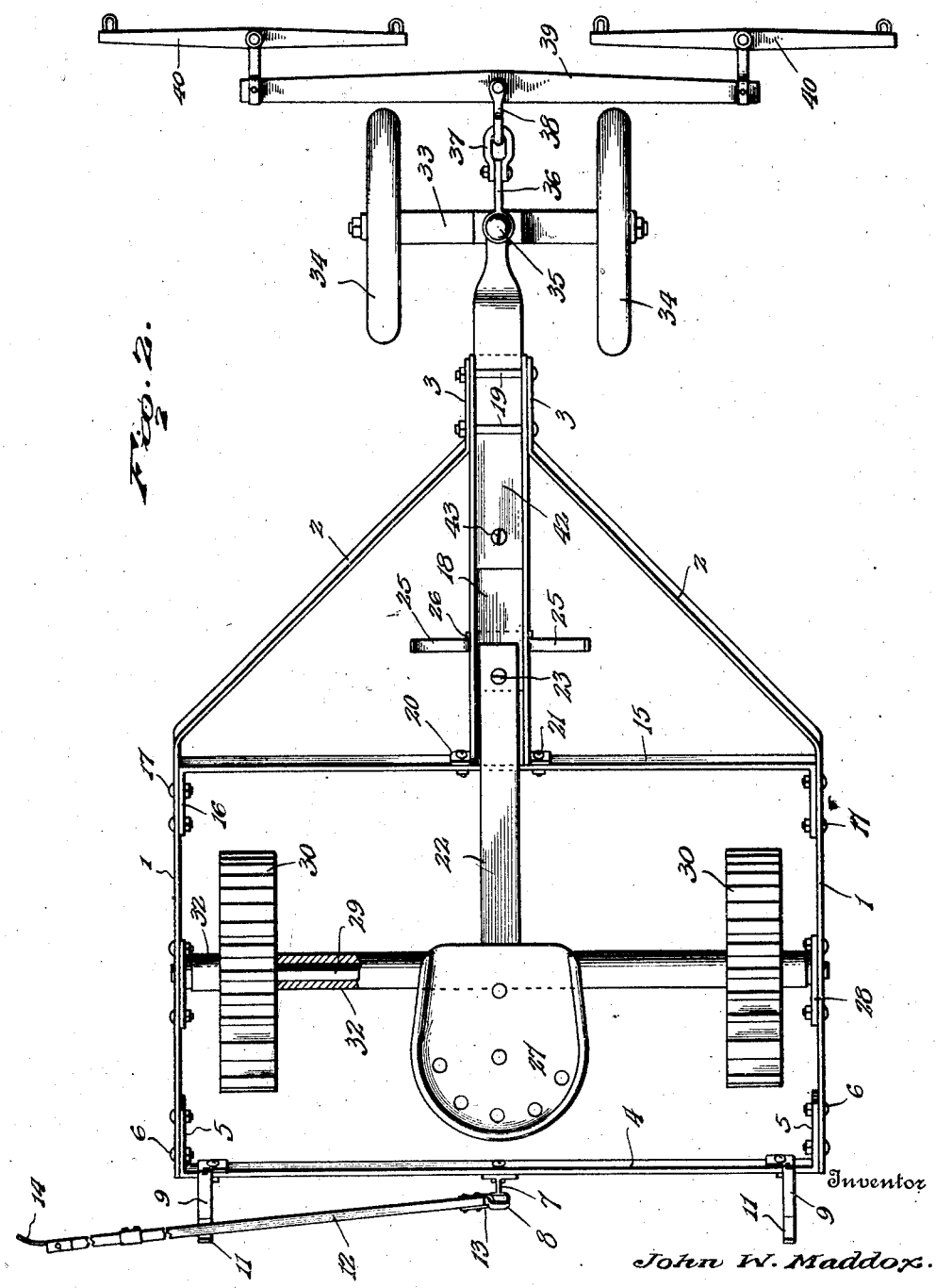

Patented Sept. 27, 1927.

1,643,625

UNITED STATES PATENT OFFICE.

JOHN W. MADDOX, OF MARION, MARYLAND.

AGRICULTURAL MACHINE.

Application filed August 11, 1926. Serial No. 128,635.

This invention relates to means for tilling the soil and has for its object the provision of a very simple and inexpensive machine which will be strong and durable and provide a firm seat for a draft tongue. The object is attained in such a machine as is illustrated in the accompanying drawings, and the invention resides in certain novel features which will be particularly pointed out in the appended claims.

In the drawings:

Figure 1 is a side elevation, partly broken away and in section, of a machine arranged for marking a field prior to planting;

Fig. 2 is a plan view, partly broken away, of the machine shown in Fig. 1;

Fig. 3 is a detail sectional elevation.

In carrying out the invention, I provide a substantially rectangular frame including side bars 1 which have their front end portions converging forwardly, as shown at 2, and terminating in relatively short parallel straps 3, the terminal strap portions being disposed at a slight angle to the main portions of the bars. The rear extremities of the side bars 1 are connected by a rear cross bar 4 having its ends turned forwardly at right angles, as shown at 5, and secured to the inner sides of the rear ends of the side bars by bolts 6. At the center of this rear cross bar 4, I secure a short upstanding post 7 which has its upper end formed into an elliptical eye 8 extending parallel with the bar 4, as shown clearly in Fig. 2. To the ends of the bar 4, I secure rests 9 which may consist of brackets having rearwardly extending seats 10 and upturned guards or stops 11. A marker bar 12 is provided at its inner end with a loop 13 engaged through and movably held in the eye 8 so that the marker bar may be swung to either side of the machine, as will be understood upon reference to the drawings. At the outer free end of the marker bar is secured a scriber 14 which may be given any desired or approved formation and is adapted to run upon the ground at the side of the machine, as indicated in Fig. 2, and mark a line upon the surface as the machine is drawn over the field, which line will serve as a guide for the next trip across the field. The bar 12 can be easily swung to either side of the machine and will rest upon the seats 10 of the brackets 9 and will be held against movement away from the machine frame by the stops or guards 11 in an obvious manner.

A front cross bar 15 is also provided, and this bar has its ends bent rearwardly at right angles, as shown at 16, and secured to the side bars 1 near the ends of the converging portions 2 by bolts 17. Disposed between the terminal strips 3 and extending rearwardly therefrom to the cross bar 15 is a trough or channel 18 which constitutes a tongue seat. The front end of this tongue seat channel 18 is secured to and held between the straps 3 by bolts 19 inserted through the said straps and the side webs of the channel and equipped with suitable nuts, as shown, while the rear end of the channel is disposed immediately over the cross bar 15 and is provided with a depending tongue or lug 20 adapted to rest against the said cross bar and secured to the same by bolts 21 inserted through its ends and through the cross bar, as shown clearly in Fig. 2. A seat standard 22 has its front end fitting in the trough or channel 18 near the rear end thereof and is secured thereto by a bolt 23 inserted through the end of the standard and the bottom of the channel, and this same bolt passes through the base plate 24 of a foot rest having its ends 25 disposed at the sides of the channel, as shown. The foot rest consists of stirrups having inner end portions 26 rising from and formed integral with the side edges of the base plate 24 at the front end thereof. A seat 27 of well known form is carried by the upper rear end of the seat standard, as shown.

Secured to the side bars 1, preferably midway between the cross bars 4 and 15, are depending brackets 28 in which are secured the ends of an axle 29. Fitted loosely upon this axle within the frame and adjacent the side bars are marking rollers or disks 30 having teeth 31 formed across their peripheries. Obviously, these marking rollers will rotate upon the axle 29 as the machine is drawn over the field and will impress well defined paths in the soil. The marking rollers may be set at any desired distance apart upon the axle 29 and will be held in the proper spaced relation by spacing sleeves 32 fitted upon the axle between the marking rollers and between the rollers and the sides of the frame. It is the intention to provide a plurality of spacing sleeves of various lengths so that, by employing the proper sleeves and arranging them in the proper combination, the marking rollers may be set to define rows at any distance apart.

Upon reference to Fig. 1, it will be noted that the frame of the machine is disposed in an inclined position longitudinally so that the front end thereof will be disposed at the proper height for effectual application of draft while marking rollers of relatively small diameter may be employed. To apply draft to the machine and support the front end thereof, I provide a front truck which comprises an arched cross bar 33 having ground wheels 34 revolubly mounted at its ends. The cross bar 33 is mounted at its center upon the lower end of a king bolt 35 which extends upwardly from the cross bar and has a vertically disposed yoke 36 fitted thereon, the ends of the yoke encircling the king bolt immediately over the cross bar and at the upper extremity of the bolt. To this yoke 36 is pivoted an eye or link 37 in which is engaged a clip 38 carrying a doubletree 39 to which, in turn, singletrees 40 are attached thereby providing for the hitching of a pair of horses or other draft animals to the machine. It is to be understood, however, that the whiffletrees may be discarded and a tractor connected with the yoke 36 if desired. Pivotally engaged about the king bolt 35 between the ends of the yoke 36 are the ends of a fork 41 which is formed at the front end of a draft plate 42 fitting snugly within the channel or trough 18 and secured therein at its rear end by a bolt 43, as will be understood. This plate 42 constitutes a tongue whereby the draft will be transmitted to the main frame of the machine, and, consequently, the machine may be caused to travel over the field. The draft will be applied at a point midway between the wheels 34 and, consequently, will be received equally by them so that, while they are free to turn pivotally about the king bolt and thereby facilitate the turning of the machine when the end of the field has been reached, they will normally extend parallel with the sides of the frame and the cross bar 33 will remain at a right angle to the line of draft so that the machine will move in a straight line, as is desired. The truck, however, may swing so as to pass around large obstructions which may be encountered and the fork 41 is so formed that the front end of the frame will be disposed above the horizontal plane of the highest point of the wheels and, consequently, the wheels may move below the frame and the tongue plate 42 so that a very short turn can be made.

When the machine is used as a marker, it will be drawn successively in parallel rows back and forth across the field until the entire area has been covered. Parallel rows will thus, of course, be marked upon the ground indicating the lines upon which seed may be planted in order to raise crops which are usually cultivated in rows. Many crops are found to be most successful when planted at the centers of squares and my machine may be very successfully used to mark off planting squares by driving it successively in parallel rows across the field at right angles to the rows first marked in the manner just described. Obviously, a second series of parallel rows will thus be formed intersecting the first marked rows at right angles so that squares will be defined facilitating the location of the hills to be planted.

The marking rollers 30 having transverse teeth upon their peripheries are highly efficient, but for various reasons it is sometimes desirable to employ other forms of marking rollers and in Fig. 3 I have illustrated a form of marking roller in which the periphery is grooved or dished transversely, as shown at 44, the periphery being otherwise smooth. When a marking roller of this form is provided, two close parallel lines will obviously be marked upon the ground instead of a plurality of closely spaced short transverse lines as is the result of using the rollers 30. The rollers 30 and 44 may be used interchangeably by merely removing the spacing sleeves and the rollers from the axle 29 and substituting other proper spacing sleeves and the other form of rollers. In Fig. 3, I have shown the marking rollers separated by short spacing sleeves and have also shown four marking rollers instead of the two marking rollers shown in Fig. 2. As has been said, the rollers may be employed in any desired number and spaced apart any desired distance.

A very slight change from the arrangement illustrated in Figs. 1 and 2 will serve to convert the machine into a clod crusher and pulverizer. For this purpose, the rollers 30 are provided in such number that they will extend approximately the full length of the axle 29 and will fit closely side by side so as to present approximately a continuous working surface. Inasmuch as the line marker is not necessary when using the machine as a clod crusher and its presence might be a detriment, I remove the bolts 6 so that the cross bar 4 with the marker mounted thereon may be withdrawn, and substitute for said cross bar a cross bar which is secured in place by the same bolts 6 and is the same in all respects as the bar 4, except that the elements 7 and 9 are omitted. Inasmuch as the object of the clod crusher is to reduce the surface soil to a fine smooth mulch and the truck wheels 34 would tend to produce ruts, I dispense with the front truck in this disposition or adjustment of the machine and substitute a steering tongue or pole having its rear end fitting closely within the trough or channel 18 and secured therein by bolts inserted through the side webs of the channel and other openings provided therefor in the rear end portion of the tongue, the draftapplying devices being mounted directly upon the tongue.

From the foregoing description, taken in connection with the accompanying drawings, it will be seen that I have provided a very simple and inexpensive machine whereby a farmer may readily perform several operations necessary to prepare a field for the planting and cultivation of a crop. The one machine serves the purposes of several different machines as tilling operations are now most generally performed and, consequently, effects an economy which will result in greater profit to the farmer in disposing of his crops.

Having thus described the invention, I claim:

1. A machine for the purposes set forth comprising a frame including side bars having forwardly converging portions which terminate in parallel end straps, a cross bar secured to and extending between the said side bars at the rear ends of the converging portions, a channel secured to and between the said end straps and extending rearwardly therefrom to a point over the cross bar, and means for securing the rear end of the channel to the cross bar, said channel constituting a tongue-receiving seat.

2. A machine for the purposes set forth comprising a frame consisting of side bars having forwardly converging portions which terminate in parallel straps disposed at a slight angle to the side bars, a channel having its front end secured to and between said end straps, a cross bar secured to and extending between the side bars below the rear end of the channel, an attaching plate depending from the rear end of the channel and secured to the cross bar, a draft device seating in and secured to the channel, a seat-carrying standard having its front end fitted in the channel near the rear end thereof, foot rests having a base plate in common disposed under the channel, and a single securing device securing the seat standard and the base plate to the channel.

In testimony whereof I affix my signature.

JOHN W. MADDOX. [L. S.].